United States Patent [19]

Craig

[11] Patent Number: 4,882,919

[45] Date of Patent: Nov. 28, 1989

[54] FLUSH MOUNTED PANEL LOCK CONSTRUCTION

[75] Inventor: Clark E. Craig, Inman, S.C.

[73] Assignee: Valhi Inc., Dallas, Tex.

[21] Appl. No.: 216,324

[22] Filed: Jul. 7, 1988

[51] Int. Cl.[4] .............................................. B60R 25/02

[52] U.S. Cl. ...................................... 70/208; 292/165; 292/DIG. 31

[58] Field of Search .......................... 70/208, 209–210, 70/207, 489, 462; 292/165, 170, 173, DIG. 31

[56] References Cited

U.S. PATENT DOCUMENTS

| | | | |
|---|---|---|---|
| 4,083,736 | 8/1987 | Weinerman | 70/208 |
| 4,578,928 | 4/1986 | Messier | 70/208 |
| 4,676,081 | 6/1987 | Craig | 70/208 |

*Primary Examiner*—Robert L. Wolfe

*Attorney, Agent, or Firm*—Allegretti & Witcoff, Ltd.

[57] ABSTRACT

A panel lock comprises an elongated housing having a generally rectangular shape with a longitudinal and transverse direction. The housing includes a cavity adapted to receive a bolt which is slidably retained for transverse movement within the housing and which projects through a passage or opening in one side of the housing. A push plate is pivotally mounted to opposite sides of the cavity in the housing and includes a cam surface cooperative with a follower associated with the bolt. Pivotal action of the push plate drives the bolt into and out of engagement with a strike that is external from the housing. A key operated latch is retained within the push plate and cooperatively engages with the housing to latch or release the plate and thereby permit pivotal action of the push plate.

4 Claims, 5 Drawing Sheets

FLUSH MOUNTED PANEL LOCK CONSTRUCTION

BACKGROUND OF THE INVENTION

This invention relates to a panel lock or a flush mounted panel lock adapted to be snapped into a recess in a movable member such as a door or slide panel in a manner which permits a bolt, incorporated as part of the lock, to engage with a strike associated with a fixed member. More particularly, the invention relates to an improved door panel lock that is adapted to be snapped into place in a movable member wherein the bolt associated with the lock is responsive to pivotal movement of a push plate incorporated with and retained by the housing for the lock.

The present applicant, in U.S. Pat. No. 4,676,081 issued June 30, 1987, disclosed a snap-in, semi-flush mounted panel lock wherein a bolt is retained within a longitudinal housing and is movable in response to a slide member associated with the housing and retained by the housing. This prior construction of a flush mounted panel lock is very useful. However, there has remained a need for a similar flush mounted panel lock wherein the bolt is reversible and wherein the bolt is also responsive to a pivoting push plate associated with the housing for the lock.

SUMMARY OF THE INVENTION

The present invention thus comprises an improved semi-flush or flush mounted panel lock construction which includes a housing having a recessed cavity therein for retention of a slidable bolt which is mounted for transverse movement with respect to the major or longitudinal direction of the housing. The slidable bolt is retained within the cavity of the housing by appropriate slide rails. A biasing spring is interposed between the bolt and the housing to normally bias the bolt outwardly into engagement with a strike external of the housing. A push plate is generally flush mounted with the top surface of the housing and includes leg members which depend from the push plate and pivotally engage the transverse side walls of the housing to permit pivotal movement of the push plate about an axis which is parallel to the direction of movement of the bolt. The push plate also includes on its underside a cam surface which is cooperatively engageable with a cam follower projecting from the slidable bolt. Pivotal action of the push plate causes the cam surface and cam follower to cooperatively relate to one another thereby moving the bolt in the transverse direction. The bolt is reversibly positioned within the cavity of the housing. A key operated latch is also retained at one end of the push plate for locking or releasing the push plate and thus permitting pivotal movement of the push plate when the latch is unlocked.

Thus, it is an object of the invention to provide an improved panel lock which is reliable and which is fabricated from parts that can be easily assembled.

A further object of the invention is to provide an improved panel lock which is compact, rugged and relatively inexpensive.

Yet another object of the invention is to provide an improved panel lock which provides for a bolt which is slidable transverse to a longitudinal housing cavity in response to pivotal motion of a push plate mounted in the housing.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
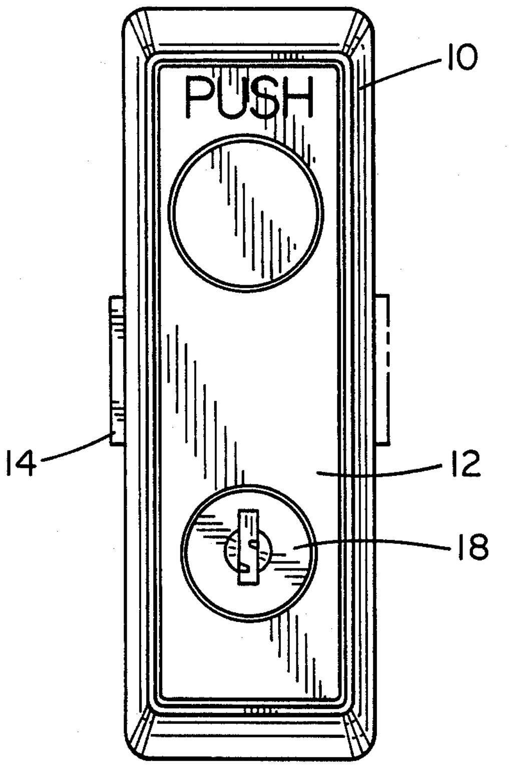
FIG. 1 is a front plan view of the assembled lock of the invention.
Figure 2:
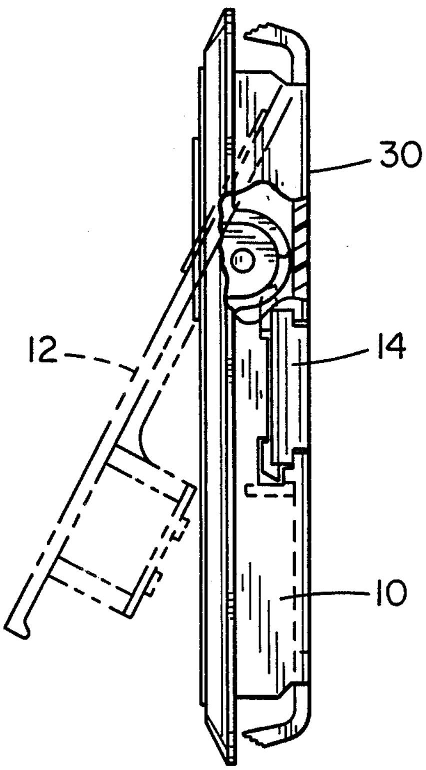
FIG. 2 is a side view of FIG. 1 showing in phantom the movement of the push plate of the panel lock.
Figure 3:
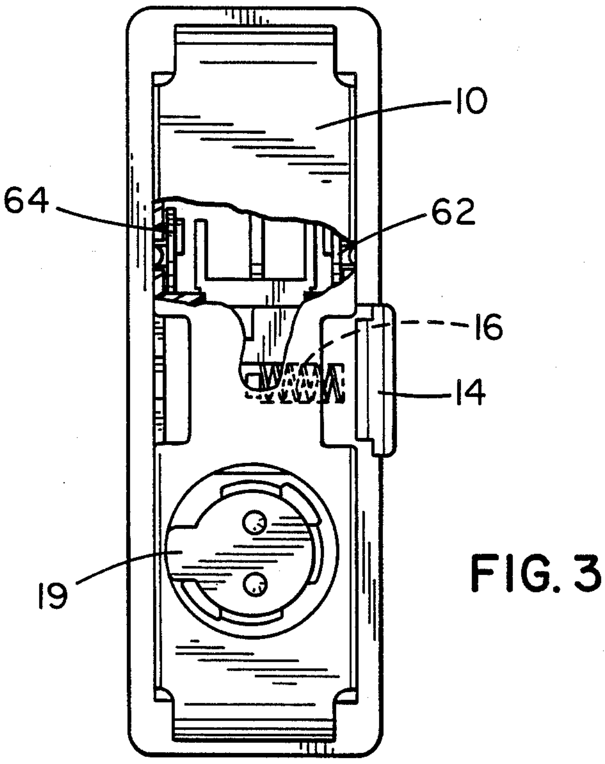
FIG. 3 is a back view of the panel lock of FIG. 1.
Figure 4:
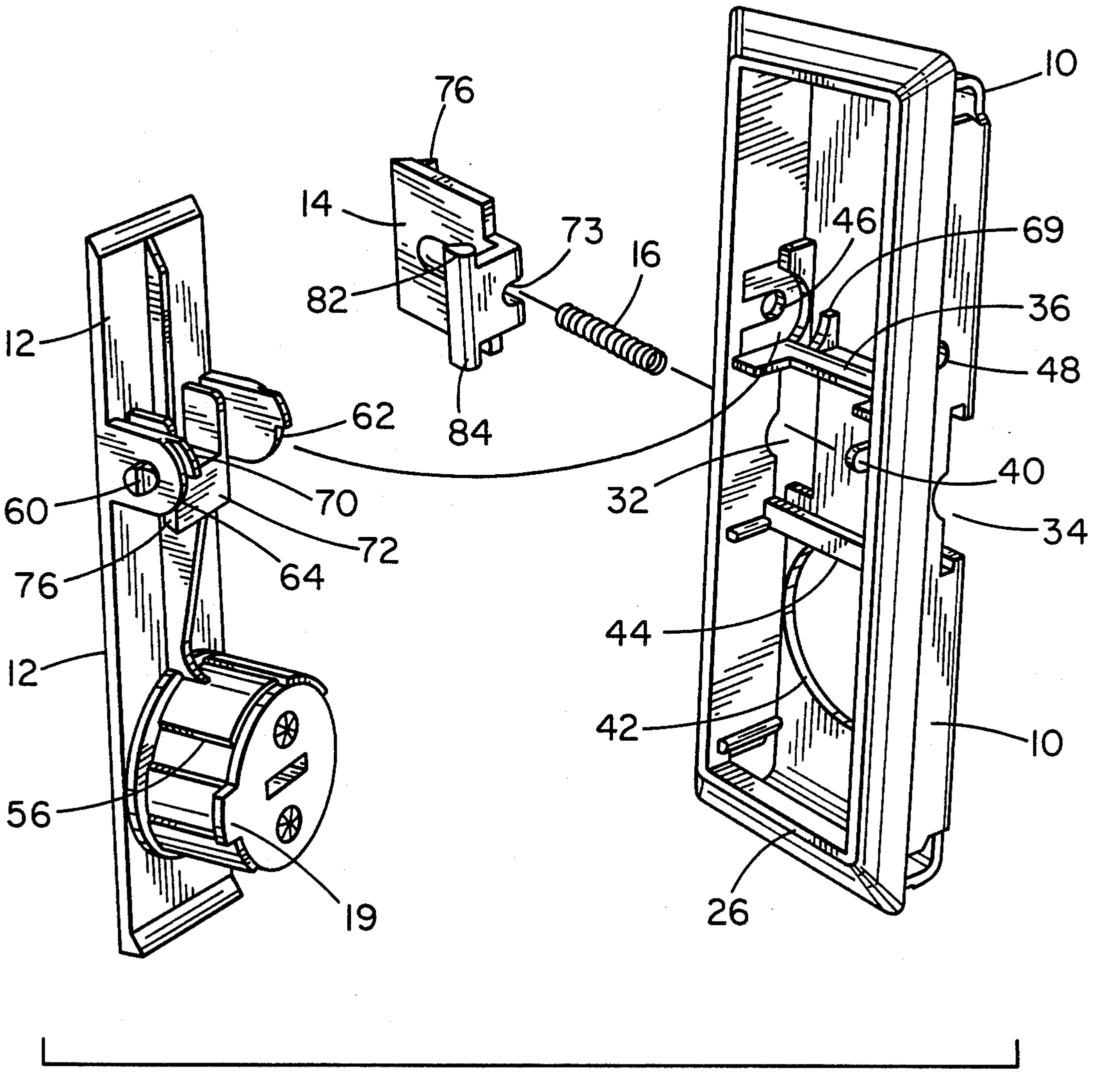
FIG. 4 is an exploded perspective view of the panel lock of FIG. 1.
Figure 5:
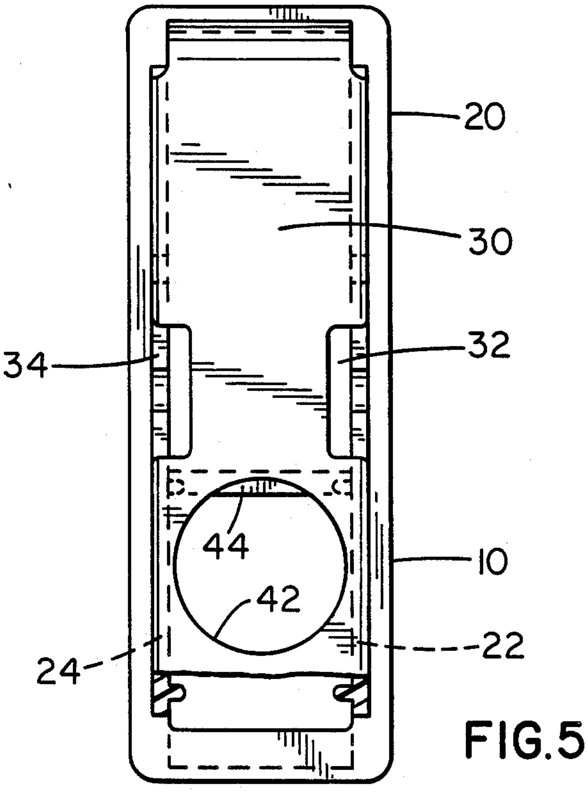
FIG. 5 is a back plan view of the housing of the lock of FIG. 1.
Figure 17:
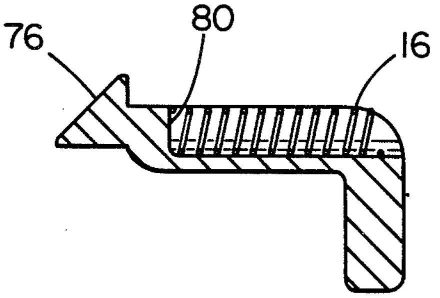
FIG. 17 is a cross sectional view of the bolt of FIG. 14 depicting the position of a biasing spring cooperatively engaging with the bolt.

The panel lock of the present invention, which is shown in assembled condition in FIGS. 1, 2 and 3, is comprised of five basic parts including a housing 10, a push plate 12 which is pivotally received by the housing 10, a bolt 14 which is slidably received within the housing 10, a bolt spring 16 which is cooperatively interposed between the housing 10 and the bolt 14 and a latch assembly 18 which may be a key operated latch retained within an appropriate cylindrical subassembly housing within the push plate 12. The housing 10 is illustrated in greater detail in FIGS. 5–8. The push plate 12 is illustrated in greater detail in FIGS. 9–13. The bolt 14 is illustrated in greater detail in FIGS. 14–17. The bolt spring 16 is also illustrated in FIG. 17. The total lock construction is illustrated in FIGS. 1–4.

The Housing

Referring therefore to FIGS. 5–8, the housing 10 is depicted as a generally rectangular molded plastic construction with a longitudinal dimension and a transverse dimension. The housing 10 thus includes a circumferential outer rim 20, transverse side walls 22 and 24, end walls 26 and 28, a recessed bottom wall 30 with an open front panel or open front to define a cavity. Defined in each side wall 22 and 24 adjacent the bottom wall 30 is a generally rectangular passage 32 and 34 for receipt of the bolt 14. The bolt 14 is slidable into the passage 32 or 34 to define a right hand or a left hand lock configuration. First and second rails 36 and 38 extend between the side walls 22 and 24 for cooperative engagement with the bolt 14 when it is positioned through the opening or passages 32, 34. The rails 36 and 38 restrict the sliding movement of the bolt 14 to a generally transverse direction relative to the housing 10.

Projecting upward from the bottom wall 30 intermediate the rails 36, 38 is a spring biasing tab 40 against which the coil spring or bolt spring 16 is engaged when the bolt 14 is positioned within and between the rails 36, 38. Also defined in the bottom wall 30 is a generally cylindrical opening 42 for receipt of a lock bar 19 associated with the latch assembly 18 that is retained within and by the push plate 12. The opening 42 is generally cylindrical except for a segment 44 which defines a retention bar for cooperation with lock bar 19 of latch assembly 18.

Each side wall 22 and 24 of the cavity also includes opposed molded pivot passages 46 and 48 which define an axis of rotation 50 for the push plate 12 which is snap fitted (as described below) into the housing 10 by cooperative engagement of appropriate pivot pins with the pivot passages 46, 48.

Figure 6:
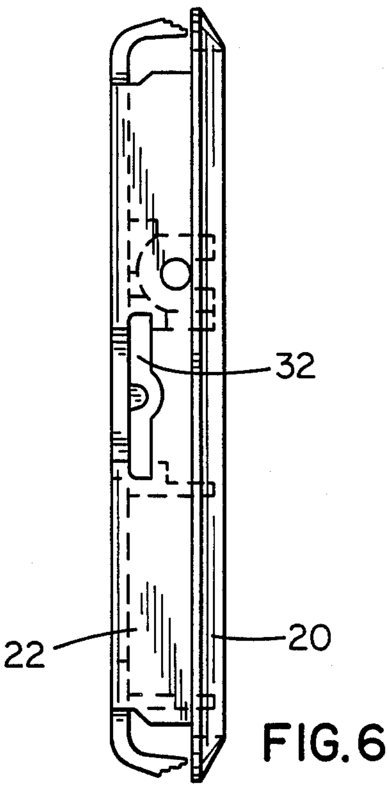
FIG. 6 is a side plan view of the housing of FIG. 5.
Figure 8:
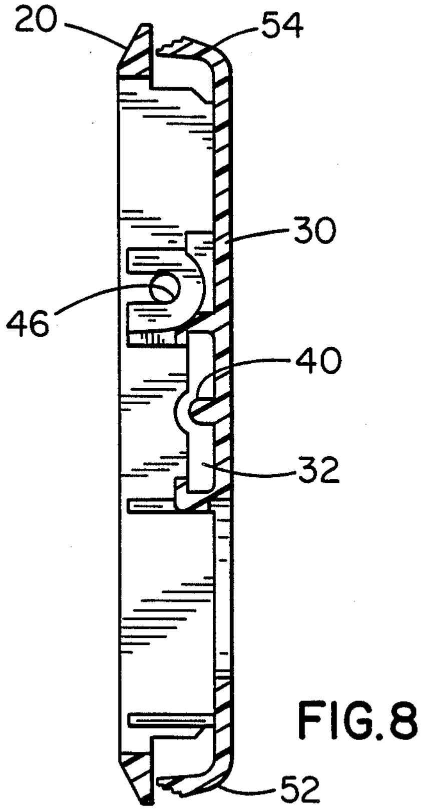
FIG. 8 is a cross sectional view of the housing of FIG. 7 taken along the line 8—8.
Figure 9:
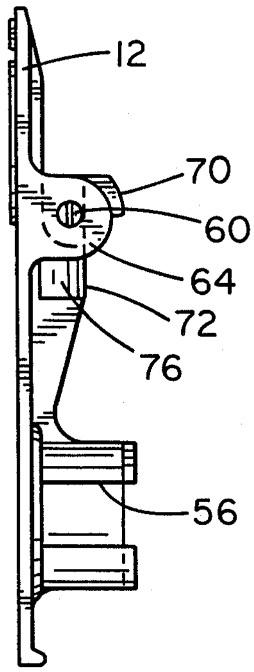
FIG. 9 is a side plan view of the push plate of the lock of FIG. 1.
Figure 10:
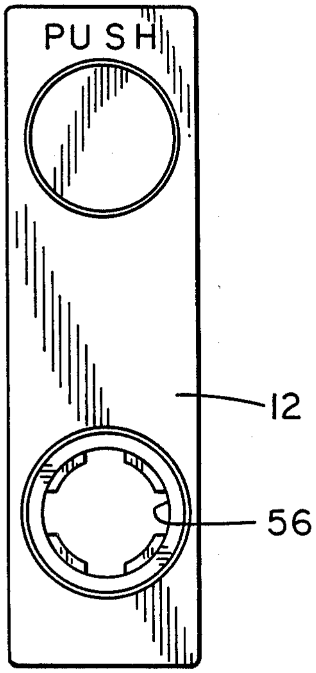
FIG. 10 is a front plan view of the plate of FIG. 9.

Flexible locking tabs or mounting fingers 52, 54 are integrally molded with the outside of housing 10 to the bottom wall 30 and extend upwardly therefrom toward the rim 20 as depicted in FIG. 6 as well as FIG. 8 to facilitate locking or attachment of the housing 10, and thus the panel lock of the invention, into a movable member, such as the door of an appliance.

The Push Plate Construction

FIGS. 9–13 illustrate the construction of the pivotal push plate 12. The plate 12 is a generally molded plastic planar member with a cylindrical passage 56 for receipt of latch assembly 18 positioned adjacent one end of the plate 12. The opposite end of the plate 12 includes, as depicted particularly in FIG. 11, a pair of projecting pivot pins 58 and 60 which extend laterally or transversely in opposite directions from the narrow dimension sides of the plate 12 and are mounted on legs 62 and 4, respectively, that are integrally molded with the plate 12. Thus, legs 62, 64 project from the undersurface of the plate 12 with transversely outwardly projecting pins 58 and 60 defining a pivot axis 66 for the plate 12. When plate 12 and housing 10 are assembled, the pivot axis 66 is coincident with the pivot axis 50 associated with the housing 10. The plate 12, of course, includes longitudinal and transverse dimensions which are compatible with those of the cavity associated with the housing 10 so that the plate 12 will fit within the cavity and may pivot within the region defined by the cavity.

Figure 7:
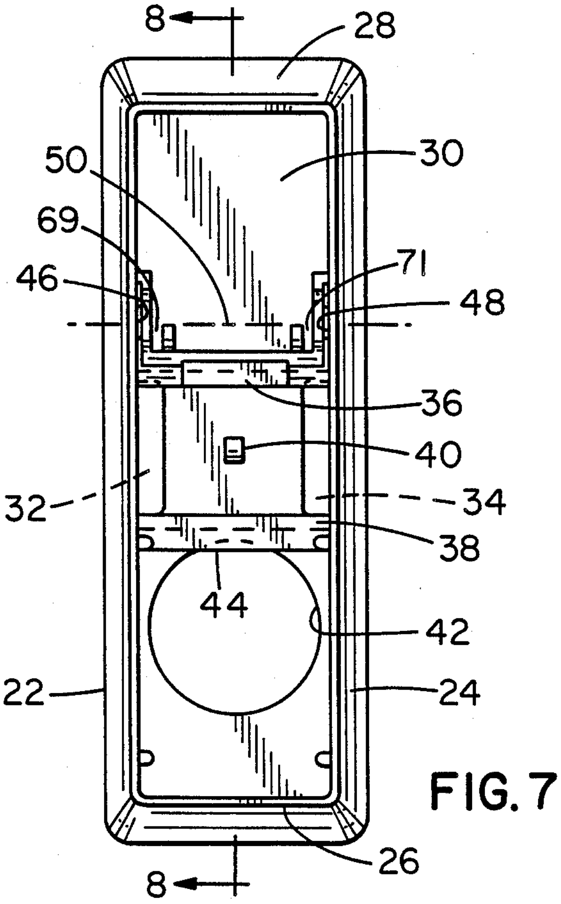
FIG. 7 is a top plan view of the housing of FIG. 5.

The legs 62, 64 of the plate 12 each include projecting segments or sectors 68, 70 which define stop tabs to limit the transverse movement of the push plate 12 legs 62 of the push plate 12 inasmuch as the tabs or segments 68, 70 cooperatively engage with retaining grooves 69 and 71, as shown in FIG. 7, of the housing 10 when the push plate 12 is pivoted about its axis 66 from the latched to the unlatched position. In the event that excessive pivoting force is applied to the plate 12, the cooperative engagement of the segments 68, 70 with grooves 69, 71 retains the legs 62, 64 and more particularly the projecting pins 58, 60 in cooperative engagement between the plate 12 and housing 10.

Figure 11:
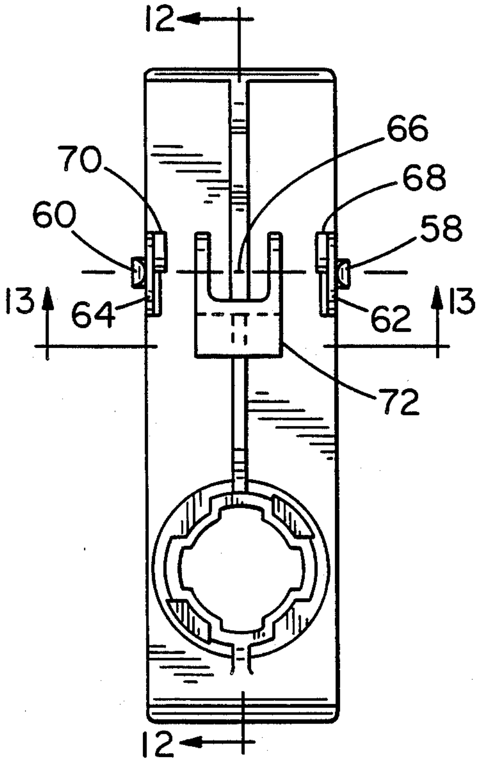
FIG. 11 is a back plan view of the plate of FIG. 9.
Figure 12:
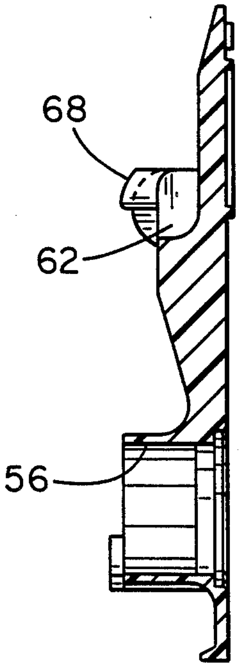
FIG. 12 is a cross sectional view of the plate of FIG. 11 taken line 12—12.
Figure 13:
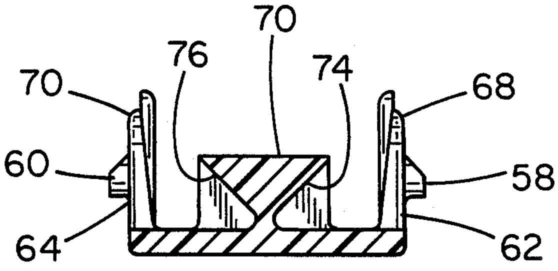
FIG. 13 is a cross sectional view of the cam surface construction of the plate of FIG. 11 taken along the line 13—13.

Also importantly, a cam surface construction is defined on the back side of the push plate 12. The cam surface construction, which is depicted in particular in FIGS. 11 and 13 is comprised of an integrally molded cam 72 which is positioned between the axis 66 and the cylinder passage or opening 56. The cam 72 has a first cam surface 74 and a second cam surface 76 which respectively are designed to cooperate with the bolt 14 when in the right hand or left hand position. Thus, cam surface 74 cooperates with the bolt 14 when the bolt 14 is positioned on one side of the cavity of housing 10. The cam surface 76 cooperates with the bolt 14 when that bolt 14 is positioned on the opposite side of the housing 10. Thus, as the plate 12 is pivoted, one cam surface 74 or 76 will engage against the bolt 14 causing the bolt 14 to retract into the cavity of the housing 10 as the push plate 12 pivots about axis 66. The segments or tabs 68, 70 limit the transverse movement along the axis of legs 62, 64. Note that the legs 62, 64 as depicted in FIG. 13 are molded so that they are biased outwardly in order to firmly snap fit into the side wall pivot passages 46, 48 of the housing 10 when the panel lock is assembled.

The Bolt Construction

Figure 14:
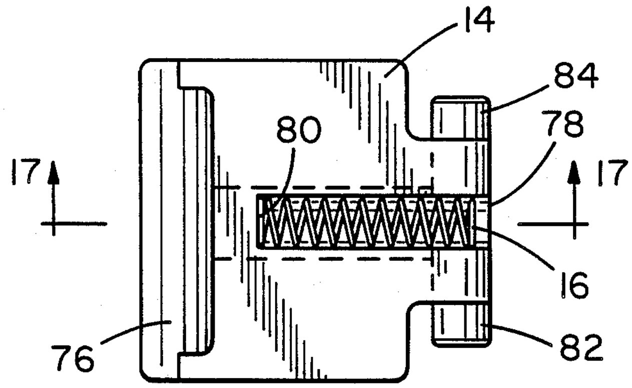
FIG. 14 is a top plan view of the bolt of the panel lock of FIG. 1.
Figure 15:
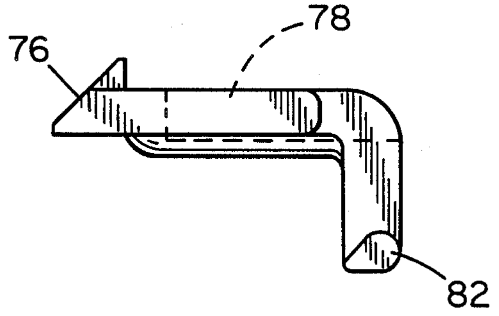
FIG. 15 is a side plan view of FIG. 14.
Figure 16:
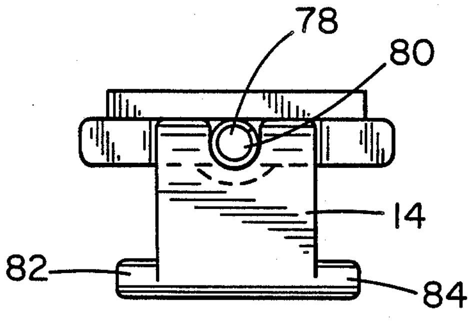
FIG. 16 is an end view of the bolt of FIG. 14.

FIGS. 14–17 illustrate the bolt construction. The bolt 14 includes a wedge shaped forward bolt face 76 adapted for cooperation with a strike. The bolt 14 is movable within the cavity along the general direction of the arrow depicted in FIG. 14. The bolt 14 includes a center line spring passage 78 for receipt of the biasing coil spring 16 as depicted in FIGS. 14 and 17. The spring 16 thus engages against a forward wall 80 of passage 78 and also engages against the tab 40 within the cavity of housing 10 to thereby bias the bolt 14 outwardly from the housing 10.

The bolt 14 also includes first and second follower members 82, 84 which are integrally molded or cast therewith. Follower members 82, 84 cooperate respectively with one of the cam surfaces 74 or 76 of the push plate 12. In the embodiment shown, the follower members 82, 84 are generally cylindrical projections that extend in the direction of the longitudinal axis of the housing 10 and perpendicular to the transverse direction of motion of the bolt 14.

Assembly and Operation

The push plate 12 is snap fitted into the housing 10 after the bolt 14 and bolt spring 16 are inserted into the appropriate opening, for example opening 32, of the housing 10. Thus, the bolt 14 is slidable transverse to the sides of the housing 10 and the push plate 12 is pivotal about axis 66 and axis 50. The cam 72 or 74 cooperatively engages with the appropriate follower 82 or 84 depending upon whether the assembly is made in a right hand or left hand fashion. The spring 16 normally biases the bolt 14 outwardly to its extended position and thus also effectively biases the plate 12 to the flush position within the cavity of the housing 10. Manual pushing of the plate 12 where indicated will cause the plate 12 to pivot outwardly as depicted in phantom in FIG. 2. This also causes the appropriate cam 72 or 74 to engage the appropriate follower 82 or 84 thereby retracting the bolt 14.

A key operated latch positioned within the cylinder opening 56 such as latch 19 as shown in FIG. 3 may be pivoted out of engagement with the bottom wall 30 and more particularly with the segment 44 of the bottom wall 30 in order to permit such pivoting action of the plate 12. Of course, if the latch 19 is rotated into position for engagement with segment 44, then the pivoting action desired by plate 12 may not be effected until the latch assembly 18 and latch 19 are rotated to the unlocked position illustrated in FIG. 3. In any event, pivotal movement of the plate 12 is limited by interaction of the plate 12 and housing 10 with the segments 68, 70 engaging the grooves 69, 71 in the manner previously described. The component parts of the assembly may be snap fitted together. The entire assembly may also be snap fitted into a movable member such as door.

Various alternative latch assemblies may be utilized with the construction of the invention. Also as described, the invention may be utilized for both left hand and right hand doors or movable members.

Thus, while there has been described a preferred embodiment of the invention, it is to be understood that the invention is to be limited only by the following claims and their equivalents.

What is claimed is:

1. A panel lock adapted to be secured in a recess in a panel comprising, in combination:

an elongated panel lock housing, securing means on the panel lock housing for securing the panel lock housing to a panel, said panel lock housing having an elongate recessed cavity with an elongate or longitudinal dimension and a transverse dimension;

a slidable bolt mounted for transverse movement in the cavity, said bolt retained in the cavity by transverse rails which guide the bolt, said housing including at least one opening in a side for receipt of the bolt and for the bolt to project therefrom for engagement with an external strike, biasing means interposed between the bolt and housing for biasing the bolt through the side opening toward engagement with a strike;

a flush mounted push plate over the top of the cavity in the housing, said push plate pivotally attached to the transverse sides of the housing and pivotal about an axis parallel to the direction of bolt movement, said plate including a depending cam surface extending into the cavity, said bolt including a follower member engaged by the cam surface and imparting a biasing force from the biasing means against the cam surface to thereby bias the push plate flush with the housing, said push plate being manually pivotal against the biasing force to engage the cam surface against the follower and translate the bolt against the force of the biasing means to a position within the housing and out of engagement with a strike;

said push plate further including first and second generally parallel depending legs projecting into the cavity, said legs each including a pivot member on the pivot axis of the plate cooperative with a transverse side wall of the cavity to thereby define the pivot axis for the push plate, said axis adjacent one side of the bolt; and at least one of said legs including a tab extension segment at the distal end of the leg, said tab extension segment cooperatively engaging with a groove inside the cavity to limit transverse movement of said leg.

2. The panel lock of claim 1 wherein the cam surface is a wedge shaped surface that engages a compatible shaped surface of the follower.

3. The panel lock of claim 1 wherein the housing includes oppositely extending openings in the transverse opposite sides for receipt of the bolt, and said bolt is insertable through either opening to thereby define a right handed or left handed lock.

4. The panel lock of claim 1 including a latch mounted in the push plate, said latch being engageable with the housing when the plate is flush with the housing to prevent pivotal movement of the push plate.

* * * * *